UNITED STATES PATENT OFFICE.

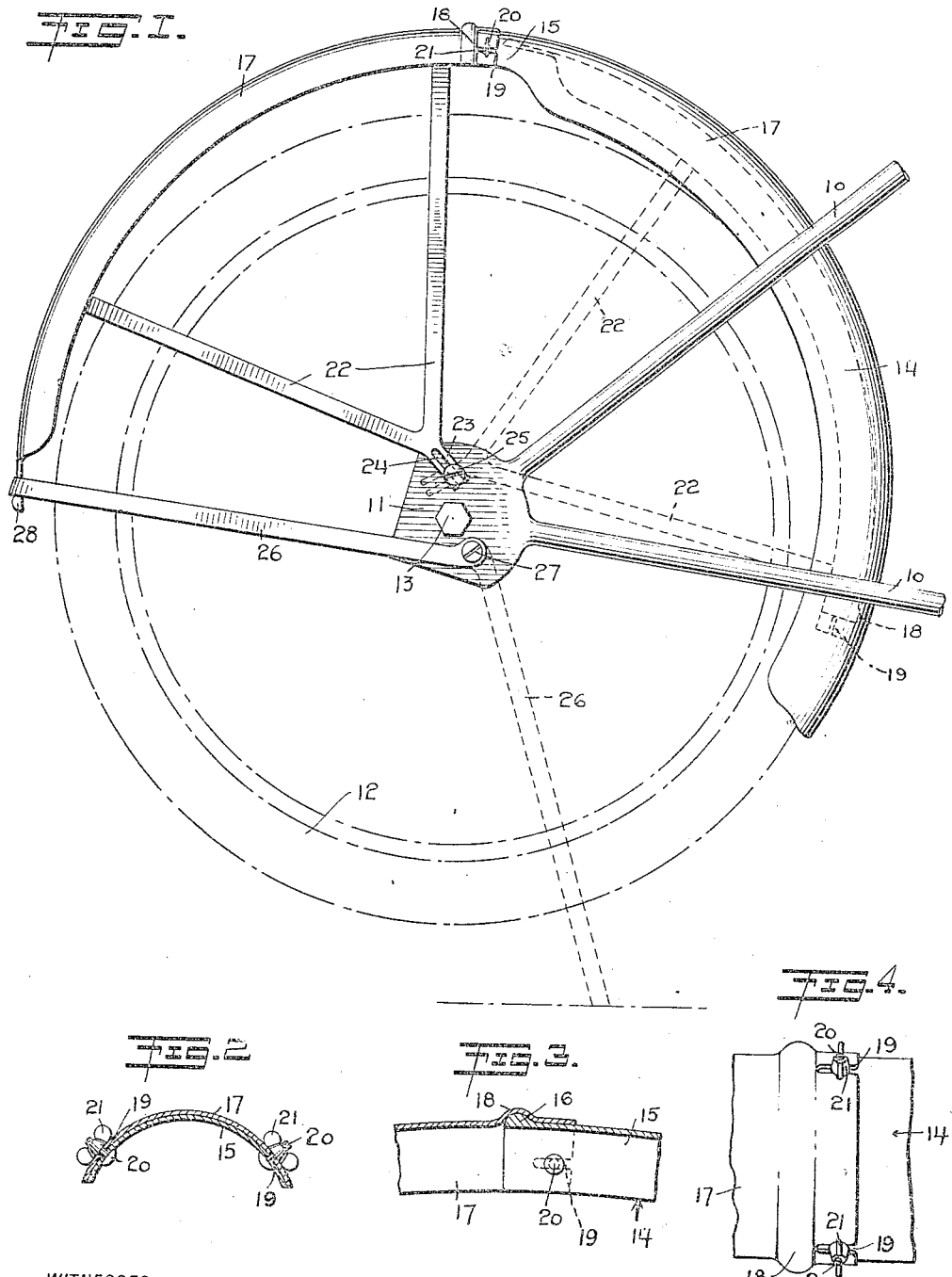

HARRY LESLIE RODERICK, OF OROVILLE, CALIFORNIA.

SECTIONAL MUD-GUARD FOR MOTOR-CYCLES.

1,112,478. Specification of Letters Patent. Patented Oct. 6, 1914.

Application filed April 30, 1913. Serial No. 764,554.

*To all whom it may concern:*

Be it known that I, HARRY L. RODERICK, a citizen of the United States, and a resident of Oroville, in the county of Butte and State of California, have invented a new and Improved Sectional Mud-Guard for Motor-Cycles, of which the following is a full, clear, and exact description.

This invention relates to an improved sectional mud guard for motorcycles, the device being designed to facilitate the removing and replacing of the rear wheel, such as for purposes of repair of the wheel or tire or for putting on a new tire.

The primary object of the invention is comprehended in the provision of a mud guard for the above purpose, which embodies a stationary section carried by the bearing parts of the rear section of the frame, and a movable section also carried thereby and designed to be shifted beneath the stationary section for the purposes specified, the movable section being also designed for supporting the usual pivoted stand in a raised position.

With the above and other objects in view, the invention resides more particularly in the peculiar combination and arrangement of parts which will be illustrated as a preferred embodiment in the accompanying drawings and described in the specification.

Reference is to be had to the accompanying drawings forming a part of this specification, in which similar characters of reference indicate corresponding parts in all the views, and in which—

Figure 1 is a side elevation of the rear portion of a motorcycle frame with the rear wheel indicated in dotted lines and with the improved sectional mud guard secured thereto, the latter being shown in connection with the supporting stand, both in operative and inoperative positions; Fig. 2 is a cross sectional view of the mud guard on an enlarged scale, taken through the joined ends of the sections thereof; Fig. 3 is a longitudinal sectional view through fragmentary portions of the mud guard sections; and Fig. 4 is a plan view of fragmentary portions of the sections at their joined ends.

In the illustrated embodiment of the invention, the numeral 10 indicates the rear portion of the motorcycle or bicycle frame, the same consisting of upper and lower forks terminating in enlarged bearing portions or plates 11 rotatably carrying the rear wheel 12 through the instrumentality of an axle 13.

The improved mud guard embodies a stationary section 14 which is substantially semi-circular in cross section and preferably formed of metal, this section being held between the forks of the frame so that its lower end extends below the lower fork and so that its upper end terminates at a point substantially vertical with respect to the axle. The stationary section encircles the tire of the wheel in the usual manner but has its upper end reduced in size, as shown at 15, such reduced portion terminating in an exterior bead 16 of convexed curvature. The movable section is indicated by the numeral 17 and conforms in size to the portion 15 of the stationary section but is provided with a raised part 18 providing an interior groove for the reception of the bead 16. The raised part 18 is spaced from the adjacent extremity of the movable section, the movable section beyond the raised portion being provided near its opposed longitudinal edges with longitudinal slots 19 which communicate with the adjacent end of the section and which are engaged by clamping bolts 20 carried by the adjacent end of the stationary section inwardly of the bead 16. Nuts 21, preferably of the winged type, are threaded on the bolts to cause the bead 16 to positively seat in the raised part 18, or rather, the groove formed by the latter, so that the sections are held against displacement one with relation to the other.

The movable section 17 is mounted upon the bearing plates 11 for adjustment through the instrumentality of a pair of substantially Y-shaped frames 22, the stems 23 of which are provided with slots 24 communicating with their free ends. Clamping screws 25 are engaged through the slots 24 and are threaded in the bearing portions 11 so as to further hold the movable section in the position above mentioned. However, when it is desired to remove the wheel for purposes of repair or otherwise, the screws 25 are loosened, as well as the winged nuts 21, and with the supporting stand 26, which is pivotally carried by the bearing portions as shown at 27, disengaged from the engaging end 28 of the movable section of the guard and shifted to the supporting position shown in dotted lines in Fig. 1, the movable section is shifted to the dotted line position also shown in Fig. 1. To accomplish this, said section is first swung toward the left to release the bolts 20 from the slots 19, and the movable section is then shifted bodily inwardly so that the screws 25 will travel in the slots 24, and in this manner the movable section will be disposed inwardly of the stationary section whereby it may be turned on the pivots formed by the fastening screws 25 and inclosed beneath the stationary section. When in this position, it is only necessary to tighten the screws 25 and the wheel may be readily removed.

The utility of the foregoing device is thought to be readily apparent, it being obvious that the device may be used in connection with various vehicles, though especially adapted for motorcycles or bicycles. An advantage also attaches to the use of the movable section owing to the fact that it can be readily secured in operative position for preventing the throwing of mud or dirt onto the back of the rider, and for supporting the stand 26 which operates in the usual manner to relieve the rear wheel of weight and to support the motorcycle when the latter is in a standing position.

Having thus described my invention, what I claim as new and desire to secure by Letters Patent is:—

1. A sectional mud guard for motorcycles embodying a stationary section carried by the frame of the motorcycle, and a movable section pivoted to the frame and adapted to aline with the stationary section.

2. A sectional mud guard for motorcycles embodying a stationary section carried by the frame of the motorcycle, a movable section pivoted to the frame and adapted to aline with the stationary section and to be shifted beneath the stationary section, and means for joining the sections in the first-named position.

3. The combination with the frame of a motorcycle or the like; of a stationary mud guard section carried by the frame, a movable section pivotally secured to the bearing portions of said frame, means for joining the extremities of the sections when the parts are in operative position, and means for clamping the movable section in such position in conjunction with the frame.

4. The combination with the frame of a motorcycle or the like; of a stationary mud guard section carried by the frame, a movable section pivotally secured to the bearing portions of said frame, means for joining the extremities of the sections when the parts are in operative position, and means for clamping the movable section in such position in conjunction with the frame, said movable section having an engaging portion for a supporting stand.

5. The combination with a frame as described having bearing plates; of a mud guard section carried by said frame parts and extending above and below the same to inclose a portion of the wheel journaled in the frame, said section having a reduced upper end provided with a bead, a movable section having a frame pivotally and slidably connected to said plates and having near one extremity a raised portion in which the bead is adapted to seat, and clamping means for removably securing the co-acting portions of the sections.

6. The combination with a frame as described having bearing plates; of a stationary mud guard section carried by said frame parts and extending above and below the same to inclose a portion of the wheel journaled in the frame, said stationary section having a reduced upper end provided with a bead, a movable section having a frame pivotally and slidably connected to said plates and having near one extremity a raised portion in which the bead is adapted to seat, clamping means for removably securing the co-acting portions of the sections, and clamping means carried by the bearing plates of the frame and extending through the frame of the movable section to secure the latter in an adjusted position extended or inclosed with relation to the stationary section.

7. The combination with a frame as described having bearing plates; of a mud guard section carried by said frame parts, said section having a bead at its upper end, a second section having slotted plate portions and having one extremity raised to receive said bead to join the sections, and clamping means carried by the bearing plates of the frame and extending through the slotted portions of the frame of the movable section to hold the latter extended or telescoped with relation to the other section.

In testimony whereof I have signed my name to this specification in the presence of two subscribing witnesses.

HARRY LESLIE RODERICK.

Witnesses:
AUSTIN R. W. SPERRY,
EDWIN L. JAMES.